(12) United States Patent
Dayley

(10) Patent No.: US 7,230,456 B2
(45) Date of Patent: Jun. 12, 2007

(54) LOW CURRENT CONSUMPTION DETECTOR CIRCUIT AND APPLICATIONS

(75) Inventor: Matthew G. Dayley, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 10/786,517

(22) Filed: Feb. 24, 2004

(65) Prior Publication Data
US 2005/0184709 A1   Aug. 25, 2005

(51) Int. Cl.
*H03K 5/153* (2006.01)

(52) U.S. Cl. .................... 327/50; 327/78; 327/143; 361/58

(58) Field of Classification Search .............. 327/143, 327/77–78, 81, 86, 198, 437, 427; 307/269, 307/362, 530, 355
See application file for complete search history.

(56) References Cited

U.S. PATENT DOCUMENTS

| 3,576,492 | A |   | 4/1971  | Rao |
| 3,976,895 | A |   | 8/1976  | Koo |
| 4,251,742 | A | * | 2/1981  | Beelitz ........................ 326/91 |
| 4,716,323 | A | * | 12/1987 | Wada et al. .................. 327/50 |
| 4,882,506 | A |   | 11/1989 | Johansson et al. |
| 5,212,616 | A | * | 5/1993  | Dhong et al. ................. 361/18 |
| 6,943,592 | B2 | * | 9/2005 | Degoirat et al. ............. 327/77 |

* cited by examiner

*Primary Examiner*—Rajnikant B. Patel
(74) *Attorney, Agent, or Firm*—Schwabe, Williamson & Wyatt, P.C.

(57) ABSTRACT

A low current consumption detector circuit, and its applications are described herein.

20 Claims, 2 Drawing Sheets

LOW CURRENT CONSUMPTION DETECTOR CIRCUIT AND APPLICATIONS

FIELD OF THE INVENTION

The present invention relates generally to the field of circuits.

BACKGROUND OF THE INVENTION

It is common for integrated circuits to have power-on circuits that detect for the application of voltage or current. Typically, a detector circuit remains active when the host system hosting the integrated circuit with the detector circuit is in a stand-by mode (e.g. a power saving mode). For various applications, e.g. wireless applications, low power consumption is an important attribute.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, a detector circuit, a switching circuit, a power-on circuit formed with the detector and switching circuits, and integrated circuits/systems formed with the power-on circuit.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

The phrase "in one embodiment" is used repeatedly. The phrase generally does not refer to the same embodiment; however, it may. The terms "comprising", "having" and "including" are synonymous, unless the context dictates otherwise.

Figure 1:
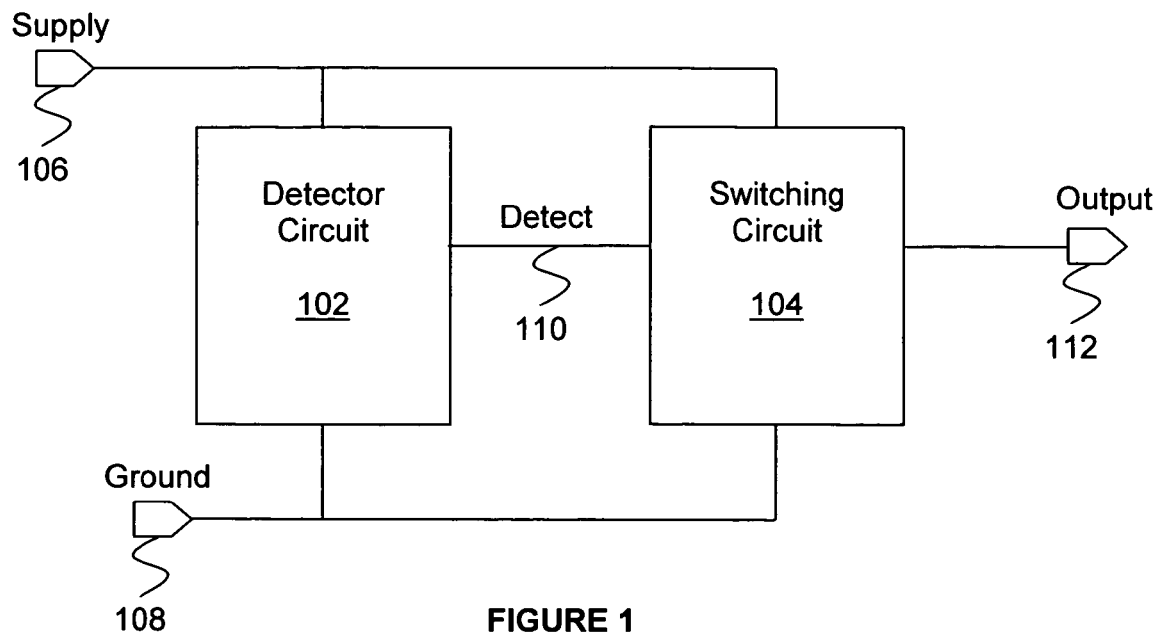
FIG. 1 illustrates a block diagram view of a power-on circuit, in accordance with an embodiment of the present invention.

Referring now to FIG. 1, wherein a block diagram view of a power-on circuit, in accordance with one embodiment, is shown. As illustrated, power-on circuit 100 includes detector circuit 102 and switching circuit 104 coupled to each other and to supply terminal 106, ground terminal 108, and output terminal 112 as shown.

Detector circuit 102 is employed to detect application of voltage at SUPPLY terminal 106 (also referred to as input terminal). More specifically, detector circuit 102 detects for voltage in excess of a supply voltage threshold. Detector circuit 102 uses DETECT signal 110 to communicate its detection results to switching circuit 104.

Switching circuit 104 is employed to pull OUTPUT terminal 112 to ground, if voltage applied to SUPPLY terminal 106 is not in excess of the supply voltage threshold. Further, switching circuit 104 is employed to couple the voltage applied to SUPPLY terminal 106 if the voltage applied is in excess of the supply voltage threshold. Switching circuit 104 performs its operation based at least in part on the state of DETECT signal 110.

Accordingly, detector circuit 102 and switching circuit 104 are complementarily designed. More specifically, in various embodiments, detector circuit 102 may be designed to output the supply voltage at SUPPLY terminal 106 as DETECT signal 110 when the supply voltage is below the supply voltage threshold, and ground the output terminal/node for DETECT signal 110 when the supply voltage exceeds the supply voltage threshold.

Further, at least detector circuit 102 is designed to be a low current consumption circuit, thereby improving the power performance of a host system hosting an integrated circuit incorporated with detector circuit 102.

In various embodiments, each of detector circuit 102 and switching circuit 104 may be formed with one or more transistor devices, e.g. MOSFET. In various embodiments, detector circuit 102 effectuates the low current consumption attribute by including at least one transistor device, e.g. a depletion NMOS device with its gate coupled to its source. The depletion NMOS device consumes substantially the same low amount of current, whether the supply voltage is below or above the supply voltage threshold. [MOSFET=Metal Oxide Semiconductor Field Effect Transistor, and NMOS=n-type Source and Drain, p-type Body connected to Ground.]

Figure 2:
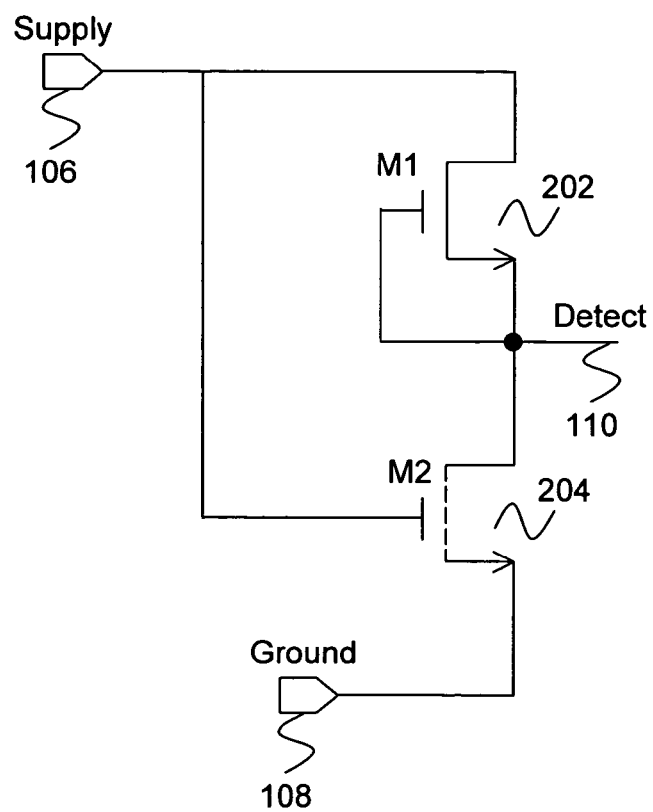
FIG. 2 illustrates the detector circuit of FIG. 1 in further detail, in accordance with one embodiment.

FIG. 2 illustrates detector circuit 102 in further detail, in accordance with one embodiment. As illustrated, for the embodiment, detector circuit 102 may include transistor devices 202 and 204 coupled to each other, SUPPLY terminal 106, GROUND terminal 108, and node for outputting DETECT signal 110 as shown.

In various embodiments, transistor devices 202 and 204 may be designed to have complementary different trigger voltages. More specifically, transistor device 202 may be designed to have a lower trigger voltage, whereas transistor device 204 may be designed to have a higher trigger voltage. The detector trip point, which is the supply voltage level that causes DETECT signal 110 to denote application of supply voltage at SUPPLY terminal 110 is a function of these trigger voltages. Accordingly, the detector trip point may be varied for different designs by varying the trigger voltages, which may be varied e.g. by varying the aspect ratios (width/length) of the transistor devices.

In various embodiments, transistor devices 202 and 204 are MOSFETs. More specifically, transistor device 202 is a depletion NMOS device having a negative threshold voltage (hereinafter, also referred to as M1), whereas transistor device 204 is an enhancement NMOS device having a positive threshold voltage (hereinafter, also referred to as M2). Thus, the earlier described trip voltage is the difference between these threshold voltages. For example, if the threshold voltage of M1 is −0.1v, and the threshold voltage of M2 is 0.7v, the detector trip point is 0.8v. [Hereinafter, an enhancement NMOS device may also be referred to as a standard NMOS device or simply, a NMOS device.]

For the illustrated embodiment, M1 202 is further configured to have its gate connected to its source.

Thus, during operation, when the supply voltage applied to SUPPLY terminal 106 is below the supply voltage threshold, M1 202 is "ON", but M2 204 is "OFF", allowing M1 202 to pull the node outputting DETECT signal 110 to the supply voltage at SUPPLY terminal 110. However, when the supply voltage applied to SUPPLY terminal 106 exceeds the supply voltage threshold, M2 204 is "ON", pulling the node outputting DETECT signal 110 to ground. However, by virtue of the small gate drive across M1 (employment of low aspect ratio to provide low trigger voltage), the amount of current consumed by M1 is substantially the same below or above the supply voltage threshold.

As those skilled in the art will appreciate, in the prior art, a diode-connected load approach is often employed, which allows the current consumption by M1 to continue to rise with the increase in voltage applied. Thus, in contrast, embodiments of the present invention are more efficient in current consumption, that is, lower current consumption.

In the foregoing embodiment, the trip point of detector circuit 102 is the difference between the trigger voltages of M1 202 and M2 204. In alternate embodiments, additional circuit elements may be employed to effectuate a trip point based on other relationships of the trigger voltages of M1 202 and M2 204 (beside merely their difference). For example, 4 resistors may be provided to the path between SUPPLY and GROUND, and the voltage between the "bottom" and the "second to bottom" resistor is coupled to the gate of M2 204 instead. Assuming the trigger voltages of M1 202 and M2 204 are still 0.7v and −0.1v respectively, the trip point of detector circuit 102 (with the above described modifications) now become 4 * (0.7v−−0.1v) or 3.2v (instead of 0.8v as earlier described). With these adjustments, detector circuit 102 may be employed to detect application of higher voltages.

Figure 3:
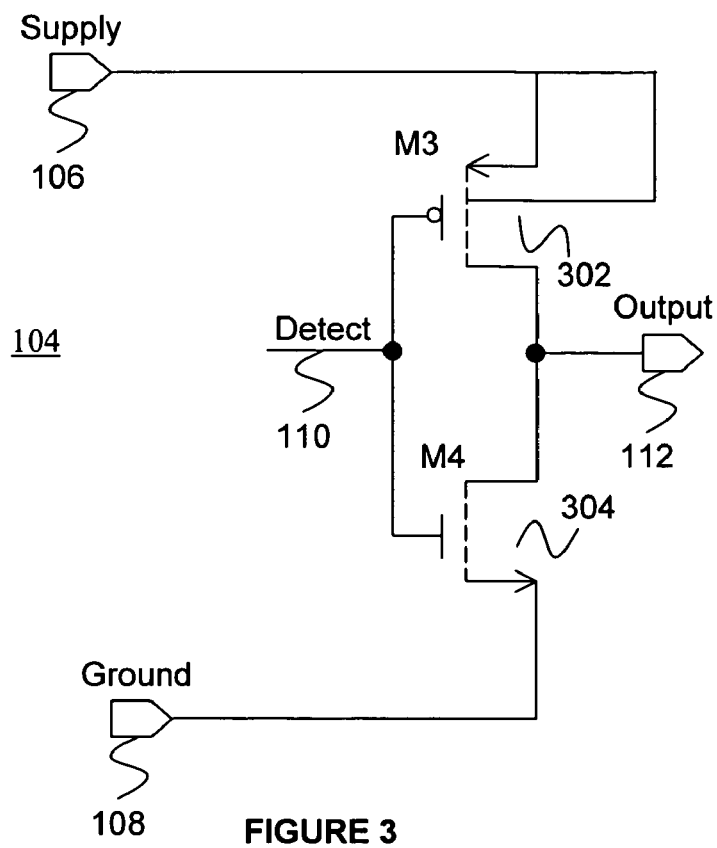
FIG. 3 illustrates the switching circuit of FIG. 1 in further detail, in accordance with another embodiment of the present invention.

FIG. 3 illustrates switching circuit 104 in further detail, in accordance with one embodiment. As illustrated, switching circuit 104 includes a number of transistor devices 302 and 304 coupled to each other, SUPPLY terminal 106, the node outputting DETECT signal 110, GROUND terminal 108, and OUTPUT terminal 112, as shown.

In various embodiments, transistor devices 302 and 304 may be MOSFETs. More specifically, transistor device 302 may be a PMOS device (hereinafter, also referred to as M3), whereas transistor device 304 is a NMOS device (hereinafter, also referred to as M4). [PMOS=p-type Source and Drain, n-type Body connected to power supply.

Thus, during operation, when DETECT signal 110 is at the supply voltage (when the supply voltage applied to SUPPLY terminal 106 is below the supply voltage threshold (for the detector circuit of FIG. 2)), M3 302 is "OFF", but M4 304 is "ON", pulling OUTPUT terminal 112 to ground. However, when the node outputting DETECT signal 110 is grounded (when the supply voltage applied to SUPPLY terminal 106 exceeds the supply voltage threshold (for the detector circuit of FIG. 2)), M3 302 is "ON" and M4 304 is "OFF", pulling OUTPUT terminal 112 to the supply voltage.

In the foregoing embodiment, switching circuit 104 includes two transistor devices. In alternate embodiments, switching circuit 104 may employ more or less circuit elements, including a single circuit element. For example, in lieu of the above described device arrangement, a single NOR gate may be provided as switching circuit 104 (with its inputs coupled to SUPPLY and DETECT). For such an embodiment, the NOR gate would output SUPPLY, when DETECT is "0". Accordingly, the term "switching circuit" as used herein in the specification and in the claim includes "circuits" having as little as a single circuit element.

Figure 4:
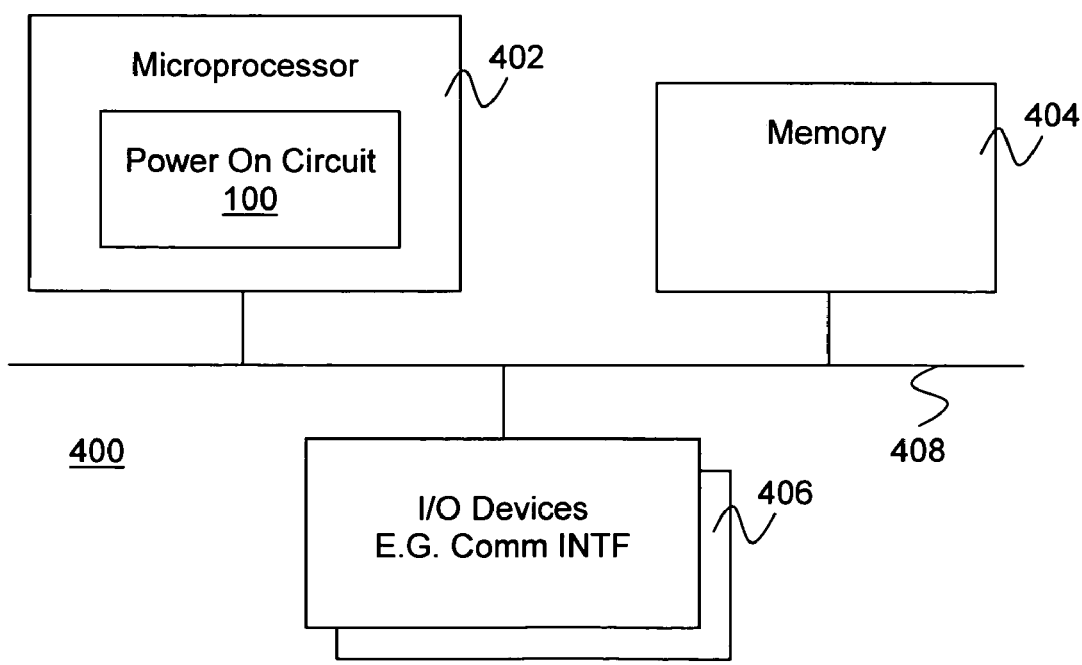
FIG. 4 illustrates an example host system having an example integrated circuit incorporated with the power-on circuit of FIG. 1, in accordance with one embodiment.

FIG. 4 illustrates an example host system to host an integrated circuit incorporated with power-on circuit 100, in accordance with one embodiment. As illustrated, example system 400 includes microprocessor 402 incorporated with power-on circuit 100. Further, system 400 includes memory 404, and a number of I/O devices 406, coupled to each other and microprocessor 402 via bus 408.

Except for the incorporation of power-on circuit 100 with microprocessor 402, elements 402-408 represent a broad range of these elements known in the art or to be designed. In particular, examples of I/O devices 406 include but are not limited to keyboard, pointing devices, display, mass storage, communication interfaces (both wire line based or wireless), and so forth.

In various embodiments, example system 400 may be a server, a desktop computer, a laptop computer, a tablet computer, a hand held computing device, and so forth. In other embodiments, example system 400 may be a set-top box, a CD player, a DVD player, a digital camera, a digital camcorder, a wireless mobile phone, and so forth.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A detector circuit comprising:
   an input terminal;
   a ground terminal;
   an output terminal;
   a first device coupled to the input and output terminals, to pull the output terminal to a first output voltage when a supply voltage below a supply threshold is applied to the input terminal, and the first device being configured to have no substantial change in current consumption after the supply voltage applied to the input terminal has exceeded the supply threshold; the first device comprises a depletion NMOS device with a drain of the depletion NMOS device coupled to the input terminal, and a source of the depletion NMOS device coupled to a gate of the depletion NMOS device and the output terminal; and
   a second device coupled to the input, ground and output terminals, to pull the output terminal to a second output voltage when the supply voltage applied to the input terminal exceeds the supply threshold, the second device comprises a NMOS device with a drain of the NMOS device coupled to the output terminal, a gate of the NMOS device coupled to the input terminal, and a source of the NMOS device coupled to the ground terminal.

2. The detector circuit of claim 1, wherein the first output voltage is the below supply threshold supply voltage.

3. The detector circuit of claim 1, wherein the second output voltage is ground.

4. The detector circuit of claim 1, wherein the depletion NMOS device is designed with a first operational threshold voltage and the NMOS device device is designed with a second operational threshold voltage that is greater the first operational threshold voltage.

5. A method comprising:
pulling an output terminal, employing a first device, to a first output voltage when a supply voltage below a supply threshold is applied to an input terminal, with the first device configured to have no substantial change in current consumption after the supply voltage applied to the input terminal has exceeded the supply threshold;
pulling the output terminal, employing a second device, to a second output voltage when the supply voltage applied to the input terminal exceeds the supply threshold;
wherein the first device comprises a depletion NMOS device with a drain of the depletion NMOS device coupled to the input terminal, and a source of the depletion NMOS device coupled to a gate of the depletion NMOS device and the output terminal; and
wherein the second device comprises a NMOS device with a drain of the NMOS device coupled to the output terminal, a gate of the NMOS device coupled to the input terminal, and a source of the NMOS device coupled to a ground terminal.

6. The method of claim 5, wherein the first output voltage is the below supply threshold supply voltage, and the second output voltage is ground.

7. The method of claim 5, wherein the first device is designed with a first operational threshold voltage and the second device is designed with a second operational threshold voltage that is greater the first operational threshold voltage.

8. A circuit comprising:
an input terminal;
a ground terminal;
an output terminal;
a detector circuit including a depletion NMOS device with a drain of the depletion NMOS device coupled to the input terminal, and a source of the depletion NMOS device coupled to a gate of the depletion NMOS device and a NMOS device with a gate of the NMOS device coupled to the input terminal, and a source of the NMOS device coupled to the ground terminal, the detector circuit to output a first detection voltage when a supply voltage applied to the input terminal is below a supply threshold, and a second detection voltage when the supply voltage exceeds the supply threshold, with at least one of the depletion NMOS device and the NMOS device configured to have no substantial change in current consumption after the supply voltage has exceeded the supply threshold; and
a switching circuit coupled to the input, ground and output terminals, and to the source of the depletion NMOS device and to the drain of the NMOS device of the detector circuit, to couple the output terminal to ground when the detector circuit outputs the first detection voltage, and couple the supply voltage to the output terminal when the detector circuit outputs the second detection voltage.

9. The circuit of claim 8, wherein the first detection voltage is the below supply threshold supply voltage, and the second detection voltage is ground.

10. The circuit of claim 8, wherein the the depletion NMOS device is designed with a first operational threshold voltage and the NMOS device is designed with a second operational threshold voltage that is greater the first operational threshold voltage.

11. A circuit comprising:
an input terminal;
a ground terminal;
an output terminal;
a detector circuit having a first plurality of devices, coupled to the input terminal and the ground terminal, to output a first detection voltage when a supply voltage applied to the input terminal is below a supply threshold, and a second detection voltage when the supply voltage exceeds the supply threshold, with at least one of the first plurality of devices configured to have no substantial change in current consumption after the supply voltage has exceeded the supply threshold; and
a switching circuit including a PMOS device with a source of the PMOS device coupled to the input terminal, a drain of the PMOS device coupled to the output terminal, and a gate of the PMOS device coupled to the detector circuit, and a NMOS device with a drain of the NMOS device coupled to the output terminal, a gate of the NMOS device coupled to the detector circuit, and a source of the NMOS device coupled to the ground terminal, the switching circuit to couple the output terminal to ground when the detector circuit outputs the first detection voltage, and couple the supply voltage to the output terminal when the detector circuit outputs the second detection voltage, the switching circuit.

12. A method comprising:
pulling an output terminal to ground with a switching circuit responding to a first detection voltage outputted by a detector circuit when a supply voltage is below a supply threshold, the detector circuit including a plurality of devices, where at least a first of the plurality of devices is configured to consume substantially a same amount of current when the supply voltage is below the supply threshold, and when the supply voltage exceeds the supply threshold;
pulling the output terminal to the supply voltage, with the same switching responding to a second detection voltage outputted by the detector circuit when the supply voltage exceeds the supply threshold; and
wherein the first of the plurality devices is a depetion NMOS device with a drain of the depletion NMOS device coupled to an input terminal, and a source of the depletion NMOS device coupled to a gate of the depletion NMOS device and the output terminal.

13. The method of claim 12, wherein the first detection voltage is the below supply threshold supply voltage, and the second detection voltage is ground.

14. The method of claim 12, wherein the first device of the detector circuit is designed with a first operational threshold voltage, and the detector circuit further comprises a second device designed with a second operational threshold voltage that is greater the first operational threshold voltage.

15. A system comprising:
a component having a detector circuit to detect application of a supply voltage applied to the component, the detector circuit including a plurality of devices, where at least one of the devices is configured to consume substantially a same amount of current when the supply voltage is below a supply threshold and when the supply voltage is above the supply threshold;
a bus coupled to the component;
a communication interface coupled to the bus to facilitate communication with another system; and
a switching circuit coupled to the detector circuit, to output the supply voltage when the supply voltage exceeds the supply threshold, and ground its output when the supply voltage is below the supply threshold, the switching circuit including a PMOS device with a source of the PMOS device coupled to receive the supply voltage, a drain of the PMOS device coupled to an output terminal of the switching circuit to output the supply voltage or be grounded, and a gate of the PMOS device coupled to the detector circuit, and a NMOS device with a drain of the NMOS device coupled to the output terminal of the switching circuit, a gate of the NMOS device coupled to the detector circuit, and a source of the NMOS device coupled to ground.

16. The system of claim 15, wherein the detector circuit is designed to output the supply voltage when the supply voltage is below the supply threshold, and ground its output when the supply voltage exceeds the supply threshold.

17. The system of claim 15, wherein the first device of the detector circuit is designed with a first operational threshold voltage, and the detector circuit further comprises a second device designed with a second operational threshold voltage that is greater the first operational threshold voltage.

18. The system of claim 15, wherein the first device of the detector circuit is a depletion NMOS device with a gate of the depletion NMOS device coupled to a source of the depletion NMOS device.

19. The system of claim 15, wherein the component is a selected one of a microprocessor and a chipset.

20. The system of claim 15, wherein the system is a selected one of a wireless mobile phone, a personal digital assistant, a set-top box, a CD player, a DVD player, and a digital camera.

* * * * *